United States Patent
Marinangeli et al.

(10) Patent No.: US 8,519,203 B2
(45) Date of Patent: Aug. 27, 2013

(54) LOW OXYGEN BIOMASS-DERIVED PYROLYSIS OILS AND METHODS FOR PRODUCING THE SAME

(75) Inventors: Richard Marinangeli, Arlington Heights, IL (US); Timothy A. Brandvold, Arlington Heights, IL (US); Joseph A. Kocal, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 780 days.

(21) Appl. No.: 12/707,433

(22) Filed: Feb. 17, 2010

(65) Prior Publication Data

US 2011/0201855 A1    Aug. 18, 2011

(51) Int. Cl.
*C01C 1/00* (2006.01)

(52) U.S. Cl.
USPC .................. 585/240; 585/242; 44/605

(58) Field of Classification Search
USPC .............. 585/240, 242; 44/605, 606
See application file for complete search history.

(56) References Cited

U.S. PATENT DOCUMENTS

| | | | |
|---|---|---|---|
| 3,130,007 A | 4/1964 | Breck | |
| 4,300,009 A | 11/1981 | Haag et al. | |
| 4,308,411 A * | 12/1981 | Frankiewicz | 585/240 |
| 4,584,947 A | 4/1986 | Chittick | |
| 5,136,117 A | 8/1992 | Paisley et al. | |
| 5,326,919 A | 7/1994 | Paisley et al. | |
| 5,792,340 A | 8/1998 | Freel et al. | |
| 5,961,786 A | 10/1999 | Freel et al. | |
| 6,743,746 B1 | 6/2004 | Prilutsky et al. | |
| 7,202,389 B1 | 4/2007 | Brem | |
| 7,285,186 B2 | 10/2007 | Tokarz | |
| 7,563,345 B2 | 7/2009 | Tokarz | |
| 7,578,927 B2 * | 8/2009 | Marker et al. | 208/67 |
| 7,982,075 B2 | 7/2011 | Marker et al. | |
| 7,998,455 B2 * | 8/2011 | Abbas et al. | 423/648.1 |
| 8,202,332 B2 * | 6/2012 | Agblevor | 48/197 R |
| 8,207,385 B2 * | 6/2012 | O'Connor et al. | 585/240 |
| 8,277,643 B2 * | 10/2012 | Huber et al. | 208/400 |
| 2008/0171649 A1 | 7/2008 | Jan et al. | |

(Continued)

FOREIGN PATENT DOCUMENTS

| | | |
|---|---|---|
| BR | 8304158 | 7/1984 |
| CN | 101045524 | 10/2007 |

(Continued)

OTHER PUBLICATIONS deWild, Paul, et al., Lignin Valorsation for chemicals and (transportation) fuels via (catalytic) pyrolysis and hydrodeoxgenation, Energy Research Centre at the Netherlands, www.ecn.nl. Sep. 24, 2009.

(Continued)

*Primary Examiner* — Nina Bhat
(74) *Attorney, Agent, or Firm* — David J Piasecki

(57) ABSTRACT

Low oxygen biomass-derived pyrolysis oils and methods for producing them from carbonaceous biomass feedstock are provided. The carbonaceous biomass feedstock is pyrolyzed in the presence of a catalyst comprising base metal-based catalysts, noble metal-based catalysts, treated zeolitic catalysts, or combinations thereof to produce pyrolysis gases. During pyrolysis, the catalyst catalyzes a deoxygenation reaction whereby at least a portion of the oxygenated hydrocarbons in the pyrolysis gases are converted into hydrocarbons. The oxygen is removed as carbon oxides and water. A condensable portion (the vapors) of the pyrolysis gases is condensed to low oxygen biomass-derived pyrolysis oil.

19 Claims, 2 Drawing Sheets

(56) References Cited

U.S. PATENT DOCUMENTS

| | | |
|---|---|---|
| 2008/0185112 A1 | 8/2008 | Argyropoulos |
| 2008/0274017 A1 | 11/2008 | Boykin et al. |
| 2008/0274022 A1 | 11/2008 | Boykin et al. |
| 2009/0078557 A1 | 3/2009 | Tokarz |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0165378 A1 | 7/2009 | Agblevor et al. |
| 2009/0227823 A1 | 9/2009 | Huber et al. |

FOREIGN PATENT DOCUMENTS

| | | |
|---|---|---|
| CN | 101294085 | 10/2008 |
| CN | 101318622 | 12/2008 |
| CN | 101544901 | 9/2009 |
| CN | 1015530347 | 10/2009 |
| JP | 2007229548 | 9/2007 |
| WO | 2007128798 | 11/2007 |
| WO | 2008009643 | 1/2008 |
| WO | 2008092557 A2 | 8/2008 |
| WO | 2009019520 | 2/2009 |
| WO | 2009047387 | 4/2009 |
| WO | 2009099684 | 9/2009 |
| WO | 2009118357 | 10/2009 |
| WO | 2009118363 | 10/2009 |

OTHER PUBLICATIONS

Aho, A., et al., Catalytic pyrolysis of woody biomass in a fluidized bed reactor; Influence of zeollites structure, Science Direct, Fuel 87, Feb. 19, 2008, 2493-2501.

Padmaja, K.V., et al., Upgrading of Candelilla biocrude to hydrocarbon fuels by fluid catalytic cracking, ScienceDirect, Biomass and Bioenergy 33, Aug. 11, 2009, 1664-1669.

Czernik, S.,et al., Hydrogren by Catalytic Steam Reforming of Liquid Byproducts from Biomass Thermoconversion Processes, Ind. Eng. Chem. Res. 2002, 41, American Chemical Society, Jul. 19, 2002, 4209-4215.

Valle, B., et al., Integration of Thermal Treatment and Catalytic Transformation for Upgrading Biomass Pyrolysis Oil, International Journal of Chemical Reactor Engineering, vol. 5, Article A86, 2007.

Elliott, D., Historical Developments in Hydroprocessing Bio-oils, Energy & Fuels, 21, American Chemical Society, May 2, 2007, 1792-1815.

Lappas, A.A., Production of biofuels via co-processing in conventional refining process, Catalysis Today, 145, Elsevier, Jul. 1, 2008, 55-62.

Atutxa, A., et al., Kinetic Description of the Catalytic Pyrolysis of Biomass in a Conical Spouted Bed Reactor, Energy & Fuel, 2005, 19, American Chemical Society, Mar. 19, 2005, 765-774.

Hogan, E., Thermo-Catalytic Cracking of Wood to Transportation Fuels using the RTP Process, Ensyn Technologies, Inc, Efflciency and Alternative Energy Technology Branch, National Resources Canada, Ottawa, Ontario.

Bridgewater, A.V., Principles and practices of biomass fast pyrolysis processes for liquids, Journal of Analytical and Applied Pyrolysis, 51 1999, Elsevier, 3-22.

Bimbela, F., et al., Hydrogen production by catalytic steam reforming of acetic acid, a model compound of biomass pyrolysis liquids, J. Ana App. Pyrolysis, 79(2007) 112-120.

Iojoiu, E., et al., Hydrogen production by sequential cracking of biomass-derived pyrolysis oil over noble metal catalysts supported on ceria-zirconia, Applied Catalysis A: General 323 (2007) 147-161.

Meier, D.,et al., Pyrolysis and Hydroplysis of Biomass and Lignins—Activities at the Institute of Wood Chemistry in Hamburg, Germany, Federal Research Center for Forestry and Forest Products, Hamburg, Germany.

Radlein, D., et al., Hydrocarbons from the Catalytic Pyrolysis of Biomass, Energy & Fuels, 1991, 5, American Chemical Society, 1991, 760-763.

Grange, P., et al., Hydrotreatment of pyrolysis oils from biomass: reactivity of the various categories of oxygenated compounds and preliminary techno-economical study, Catalysis Today 29 (1996) 297-301.

Olazar, M., et al., Pyrolysis of Sawducst ina Conical Spouted-Bed Reactor with a HZSM-5 Catalyst, AIChE Journal, May 2000 vol. 46., No. 5.

Nowakowski, D., et al., Potassium catalysis in the pyrolysis behaviour of short rotation willow coppice, ScienceDirect, Fuels 86, (2007) 2389-2402.

Di Blasi, C.,et al., Effects of Potassium Hydroxide Impregnation of Wood Pyrolysis, American Chemical Society, Energy & Fuels (2009) 23, 1045-1054.

Carlon, T.,et al., Aromatic Production from Catalytic Fast Pyrolysis of Biomass-Derived Feedstocks, Top Cat (2009) 52:241-242.

Lappas, A.A., et al., Biomass pyrolysis in a circulating fluid bed reactor for the production of fuels and chemicals, Fuels 81 (2002) 2087-2095.

Antonakou, E., et al., Evaluation of various types of AI-MCM-41 materials as catalysts in biomass pyrolysis for the production of bio-fuels and chemicals, ScienceDirect, Fuels 85 (2006) 2202-2212.

Carlson, T.,et al., Green Gasoline by Catalytic Fast Pyrolysis of Solid Biomass Derived Compounds, ChemSusChem, 2008.

Jackson, M.,et al., Screening heterogenous catalysts for the pyrolysis of lignin, J. Anal. Appl. Pyrolysis 85 (2009) 226-230.

Adam, J., et al., Pyrolysis of biomass in the presence of AI-MCM-41 type catalysts, ScienceDirect, Fuel, 84 (2005) 1494-1502.

Hughes, J., et al., Structural variations in natural F, OH and Cl apaties, American Mineralogists, vol. 74, 1989, 870-876.

Bridgewater, A.V., Production of high grade fuels and chemicals from catalytic pyrolysis of biomass, Catalysis Today 29:1-4:285-295; May 1996.

Czernik, S., et al., Hydrogen from biomass-production by steam reforming of biomass pyrolysis oil, ScienceDirect, Catalysis Today, 129 (2007) 265-168.

Hoekstra, E., et al., Fast Pyrolysis of Biomass in a Fluidized Bed Reactor: In Situ Filtering of the Vapors, American Chemical Society, Ing. Eng. Chem. Res 2009, 48, 4744-4756.

Gayubo, A., et al., Deactivation of HZSM-5 Zeolite Catalyst in the Transformation of the Aqueous Fraction of Biomass Pyrolysis Oil into Hydrocarbons, American Chemical Society, Energy & Fuels, 2004, 18, 1640-1647.

\* cited by examiner

US 8,519,203 B2

LOW OXYGEN BIOMASS-DERIVED PYROLYSIS OILS AND METHODS FOR PRODUCING THE SAME

STATEMENT REGARDING FEDERALLY SPONSORED RESEARCH OR DEVELOPMENT

This invention was made under the partial support of the United States Government, United States Department of Energy under Award No. DE-FG36-08GO18213. The United States Government has certain rights in the invention.

FIELD OF THE INVENTION

The present invention generally relates to biofuels and methods for producing biofuels, and more particularly relates to low oxygen biomass-derived pyrolysis oils and methods for producing the same.

DESCRIPTION OF RELATED ART

Fast pyrolysis is a thermal process during which solid carbonaceous biomass feedstock, i.e., "biomass", such as wood waste, agricultural waste, etc., is rapidly heated to pyrolysis temperatures of about 300° C. to about 800° C. in the absence of air using a pyrolysis reactor. Under these conditions, solid, liquid, and gaseous pyrolysis products are formed. A condensable portion (vapors) of the gaseous pyrolysis products is condensed into biomass-derived pyrolysis oil. Conventional biomass-derived pyrolysis oil is generally thermally unstable and acidic (as measured by the total acid number (TAN)), making it corrosive, with low energy density. Thermal instability leads to increased viscosity over time. The low energy density and poor thermal stability of the biomass-derived pyrolysis oil is attributable in large part to oxygenated hydrocarbons in the oil, which undergo secondary reactions during storage. Such oxygenated hydrocarbons include carboxylic acids, phenols, cresols, aldehydes, etc. The oxygenated hydrocarbons in the oil are derived from oxygenated hydrocarbons in the gaseous pyrolysis products produced during pyrolysis.

Biomass-derived pyrolysis oil can be burned directly as fuel for certain boiler and furnace applications, and can also serve as a potential feedstock in the production of biofuels in petroleum refineries or in stand-alone process units. Biomass-derived pyrolysis oil has the potential to replace up to 60% of transportation fuels, thereby reducing the dependency on conventional petroleum and reducing its environmental impact. However, conversion of biomass-derived pyrolysis oil into biofuels and chemicals requires full or partial deoxygenation of the biomass-derived pyrolysis oil. Such deoxygenation can proceed via two main routes, namely the elimination of either water or $CO_2$. While some deoxygenation occurs from the elimination of carbon oxides during conventional pyrolysis of the carbonaceous biomass feedstock, such deoxygenation is insufficient to produce high energy density, thermally stable biomass-derived pyrolysis oils from which biofuels and chemicals are derived.

Most efforts to deoxygenate the biomass-derived pyrolysis oils involve secondary upgrading of the biomass-derived pyrolysis oils after their production, i.e., post-pyrolysis. Such secondary upgrading, however, adds unnecessary cost and complexity to the production of low oxygen biomass-derived pyrolysis oil.

Accordingly, it is desirable to provide methods for producing low oxygen biomass-derived pyrolysis oil during the pyrolysis process, before the oil is formed, thereby reducing and potentially eliminating secondary upgrading of the oils. It is also desirable to produce low oxygen biomass-derived pyrolysis oils having increased energy density, thermal stability and lower acidity. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for producing low oxygen biomass-derived pyrolysis oil from carbonaceous biomass feedstock. In accordance with one exemplary embodiment, the method comprises pyrolyzing a carbonaceous biomass feedstock in the presence of a catalyst. The catalyst is selected from the group consisting of base metal-based catalysts, noble metal-based catalysts, treated zeolitic catalysts, and combinations thereof to produce pyrolysis gases comprising oxygenated hydrocarbons. The catalyst catalyzes a deoxygenation reaction converting at least a portion of the oxygenated hydrocarbons into hydrocarbons and oxygen and removing the oxygen as carbon oxides. A condensable portion of the pyrolysis gases is condensed to low oxygen biomass-derived pyrolysis oil.

Methods are provided for producing low oxygen biomass-derived pyrolysis oil from carbonaceous biomass feedstock pyrolyzed in a pyrolysis reactor in accordance with yet another exemplary embodiment of the present invention. The method comprises providing a catalyst selected from the group consisting of base metal-based catalysts, noble-metal based catalysts, treated zeolitic catalysts, and combinations thereof. The carbonaceous biomass feedstock is contacted with the catalyst and pyrolyzed to form pyrolysis gases comprising oxygenated hydrocarbons. The catalyst catalyzes a deoxygenation reaction converting at least a portion of the oxygenated hydrocarbons into hydrocarbons and removing the oxygen as carbon oxides. A condensable portion of the pyrolysis gases is condensed to the low oxygen biomass-derived pyrolysis oil.

Methods are provided for thermally converting carbonaceous biomass feedstock into hydrocarbons in accordance with yet another exemplary embodiment of the present invention. The method comprises pyrolyzing the carbonaceous biomass feedstock in a pyrolysis reactor to pyrolysis gases comprising oxygenated hydrocarbons and a carbon-containing solid. The carbon-containing solid may optionally be separated from the pyrolysis gases. The oxygenated hydrocarbons are deoxygenated by contacting the pyrolysis gases with a catalyst selected from the group consisting of noble metal-based catalysts, base metal-based catalysts, treated zeolitic catalysts, and combinations thereof at conditions sufficient to convert the oxygenated hydrocarbons into hydrocarbons.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to low oxygen biomass-derived pyrolysis oils and methods for producing the same. The low oxygen biomass-derived pyrolysis oils produced according to exemplary embodiments of the present invention are substantially fully hydrocarbon products (i.e., products comprising only hydrogen and carbon atoms) making them more suitable for processing into biofuels and chemicals. The methods comprise pyrolyzing carbonaceous biomass feedstock in the presence of a catalyst whereby oxygenated hydrocarbons produced as pyrolysis intermediates are substantially deoxygenated to yield substantially fully hydrocarbon pyrolysis gases, a condensable portion of which is condensed into low oxygen-biomass derived pyrolysis oil. "Hydrocarbons" as used herein are organic compounds that contain principally hydrogen and carbon, i.e., "hydrocarbons" are oxygen-free. "Hydrocarbons" include both aromatic and non-aromatic hydrocarbons. Exemplary aromatic hydrocarbons include benzene, toluene, ethylbenzene, p-xylene, and o-xylene. "Oxygenated hydrocarbons" as used herein are organic compounds containing hydrogen, carbon, and oxygen. Exemplary oxygenated hydrocarbons produced from pyrolysis include carboxylic acids such as acetic acid, phenols, cresols, and aldehydes such as furfural, levoglucosan, etc. It should be appreciated that while the oil produced according to exemplary embodiments of the present invention is generally described herein as a "low oxygen biomass-derived pyrolysis oil", this term generally includes any oil produced having a lower oxygen concentration than conventional biomass-derived pyrolysis oil. The term "low oxygen biomass-derived pyrolysis oil" includes oil having no oxygen.

Figure 1:
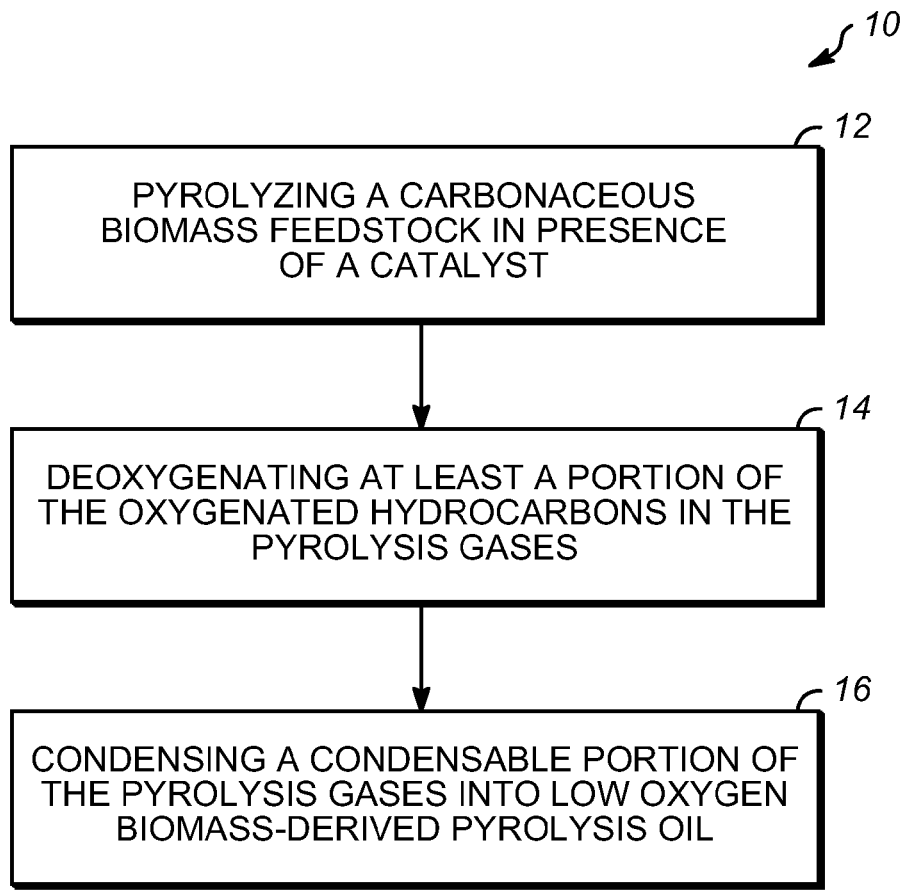
FIG. 1 is a flow chart of a method for producing low oxygen biomass-derived pyrolysis oils, according to an exemplary embodiment of the present invention.
Figure 2:
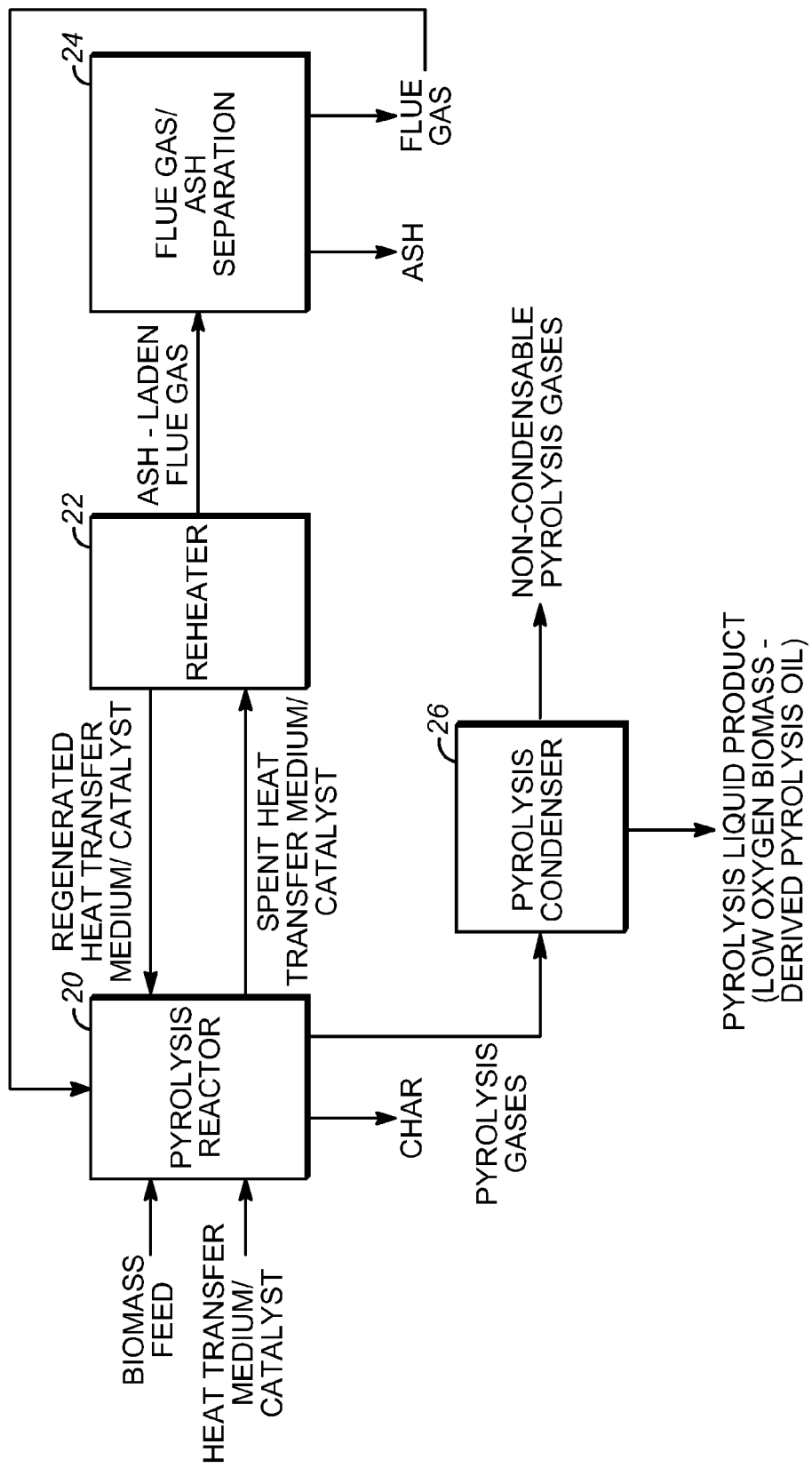
FIG. 2 is a schematic diagram of an exemplary fast pyrolysis system for producing low oxygen biomass-derived pyrolysis oils, according to an exemplary embodiment of the present invention.

As shown in FIGS. 1 and 2, in accordance with an exemplary embodiment, a method 10 for producing low oxygen biomass-derived pyrolysis oil begins by introducing carbonaceous biomass feedstock (hereinafter "biomass") into a pyrolysis reactor 20 and pyrolyzing the biomass in the presence of a catalyst (step 12). Various types of biomass may be pyrolyzed. Virtually any form of biomass can be considered for pyrolysis to produce biomass-derived pyrolysis oil. Biomass-derived pyrolysis oil may be derived from biomass material such as wood, agricultural wastes/residues, nuts and seeds, algae, grasses, forestry byproducts, cellulose and lignin, municipal waste, construction/demolition debris, or the like. The moisture in the biomass may be reduced by known drying methods prior to introduction into the pyrolysis reactor. Grinding of the biomass may also be performed prior to pyrolysis.

As used herein, a "catalyst" is defined as solid material comprising at least an active phase. The catalyst may also comprise a support material. The support material acts as a locus for combining the catalyst components together; in some cases, the support material may also have catalytic activity. The active phase contains one or more components that catalyze the desired chemical transformation. Optionally, one or more modifiers or additives may be added to the catalyst. These modifiers and/or additives serve to optimize the catalyst activity, selectivity, or stability for a specific application.

The catalyst used during the pyrolysis process is a base metal-based catalyst, a noble metal-based catalyst, a treated zeolitic catalyst, or a combination thereof. The step of pyrolyzing the carbonaceous biomass feedstock in the presence of the catalyst comprises contacting the carbonaceous biomass feedstock and/or pyrolysis gases with the catalyst.

The pyrolysis process produces a carbon-containing solid (char), and pyrolysis gases comprising a variety of oxygenated hydrocarbons, heavy hydrocarbons which include partially depolymerized biomass and light ($C_1$-$C_4$) hydrocarbons, carbon oxides such as carbon dioxide and carbon monoxide (collectively "carbon oxides"), hydrogen gas, and steam. The pyrolysis gases comprise a condensable portion (vapors) and a non-condensable portion as hereinafter described. As described previously, the oxygenated hydrocarbons include carboxylic acids, phenols, cresols, aldehydes, etc. that contribute to the thermal instability and corrosivity of conventional pyrolysis products.

At pyrolysis temperatures of about 300° C. to about 800° C., the catalyst catalyzes a deoxygenation reaction converting at least a portion of the oxygenated hydrocarbons in the pyrolysis gases into hydrocarbons (step 14). The oxygen contained in the oxygenated hydrocarbons is removed as carbon oxides. The oxygenated hydrocarbons are substantially deoxygenated; however, less than complete deoxygenation may occur. Any oxygenated hydrocarbons remaining in the pyrolysis gases after pyrolysis are referred to herein as "residual oxygenated hydrocarbons." Residual oxygenated hydrocarbons having relatively high carbon/oxygen ratio may also be desirable. While FIG. 1 shows steps 12 and 14 as separate subsequent steps for illustrative purposes, it will be understood that pyrolyzing (step 12) and deoxygenating (step 14) are being performed substantially simultaneously in the pyrolysis reactor 20 (FIG. 2).

In a preferred embodiment, the catalyst is a noble metal-based catalyst. In other words, the active phase of the catalyst comprises a noble metal component. The noble metal-based catalyst is supported in the pyrolysis reactor 20 on a low coke-forming support material. The noble metal-based catalyst may be a ruthenium-based catalyst, a rhodium-based catalyst, a palladium-based catalyst, an osmium-based catalyst, an iridium-based catalyst, a platinum-based catalyst, a silver-based catalyst, a gold-based catalyst, or a mixture thereof. The noble metal-based catalyst may contain from about 0.01% to about 10% by weight of noble metal, preferably about 0.05% to about 5% by weight, based on the support material. The noble-metal based catalysts according to exemplary embodiments have low coke forming tendencies and suitable activity for converting at least a portion of the oxygenated hydrocarbons in the pyrolysis gases into hydrocarbons. Typical support materials for ruthenium-based catalysts, rhodium-based catalysts, osmium-based catalysts, iridium-based catalysts, silver-based catalysts, and gold-based catalysts, and mixtures thereof include metal oxides such as alumina, silica-alumina, silica, titania, magnesia, and zirconia, carbon, metal carbides, metal nitrides, metal sulfides, and zeolites such as those containing structure types LTA, FAU (e.g., Zeolite Y), MOR (mordenite type zeolites), MFI (e.g., ZSM-5, ZSM-11), and BEA (beta type zeolites), and mixtures thereof. Support material for palladium-based catalysts and platinum-based catalysts include carbon, metal oxides such as silica-alumina, titania, magnesia, and zirconia, carbon, metal carbides, metal nitrides, metal sulfides and zeolites such as those containing structure types LTA, FAU, MOR MFI, and BEA, and mixtures thereof.

Alternatively, the carbonaceous biomass feedstock may be pyrolyzed in the presence of a base metal-based catalyst supported on a support material. In other words, the active phase of the catalyst comprises a base metal component. The base metals are the transition elements (Tungsten (W), Molybdenum (Mo), Rhenium (Re), Titanium (Ti), Vanadium (V), Chromium (Cr), Manganese (Mn), Iron (Fe), Cobalt (Co), Nickel (Ni), Cupper (Cu), Zinc (Zn), and combinations thereof). As used herein, "base metal-based" means that the composition has more base metal present than any other element. The base metal may be combined with one or more modifier elements (i.e., "modifiers") such as Tin (Sn), Sulfur (S), Germanium (Ge), Phosphorus (P), sodium (Na), potassium (K), Lithium (Li), Calcium (Ca), and lanthanide and actinide elements such as cerium (Ce) or Lanthanum (La). Noble or base metals may also be added to the catalyst, optionally in a sulfided form, to act as a modifier. Typical support materials include metal oxides such as silica, alumina, titania, zirconia, magnesium oxide, and silica-alumina, carbon, and zeolites such as those containing structure types LTA, FAU, MOR MFI, and BEA, and mixtures thereof. The base metal-based catalyst may contain from about 0.1% to about 30% by weight of base metal, preferably about 3% to about 20% by weight, based on the support material. The effective amount of the catalyst is expressed in a catalyst-to-biomass ratio of about 0.1 to about 10 by weight.

The zeolites themselves may also be used as a catalyst in addition to their use as a catalyst support material and such zeolites are not limited to those specifically described. Suitable zeolitic catalysts include those "treated" by exchange of metals such as sodium (Na), Lithium (Li), potassium (K), cesium (Cs), barium (Ba), calcium (Ca), gallium (Ga), Indium (In), Zinc (Zn), boron (B), and magnesium (Mg), or the like, as known to one skilled in the art, to form "treated zeolitic catalysts". Treated zeolite catalysts may also result from changes in composition and structure by dealumination. Means for dealumination include thermal treatments with or without steam present, washing with acids or bases or other chemical treatment to substitute silica for alumina in the zeolite. When treated zeolites are used as the catalyst active phase, they may be combined with a support material and one or more modifiers.

The biomass may be pyrolyzed using various pyrolysis methods including fast pyrolysis and other pyrolysis methods such as vacuum pyrolysis, slow pyrolysis, and others. Fast pyrolysis includes rapidly imparting a relatively high temperature to feedstocks for a very short residence time, typically about 0.5 seconds to about 0.5 minutes, and then rapidly reducing the temperature of the pyrolysis products before chemical equilibrium can occur. By this approach, the complex structures of the biomass are broken into reactive chemical fragments that are initially formed by depolymerization and volatilization reactions, but do not persist for any significant length of time. Fast pyrolysis is an intense, short duration process that can be carried out in a variety of pyrolysis reactors such as fixed bed pyrolysis reactors, fluidized bed pyrolysis reactors, circulating fluidized bed reactors (CFBR), or other pyrolysis reactors capable of fast pyrolysis as known in the art. For example, in an exemplary fluidized bed pyrolysis reactor, carbonaceous biomass feedstock is thermally converted (i.e., pyrolyzed) at pyrolysis temperatures (about 300° C. to about 800° C.) in the presence of a heat transfer medium.

The heat transfer medium comprises inert solids such as sand, catalytic solids, or a combination thereof. The catalytic solids may need to be formed by spray drying to a particular particle size range depending on fluidizing conditions as hereinafter described. In accordance with exemplary embodiments of the present invention, the catalytic solids may comprise the noble metal-based catalyst, the base metal-based catalyst, the treated zeolitic catalyst, or combinations thereof. These catalytic solids may, with or without inorganic inert solids such as sand, serve as the heat transfer medium for a fast pyrolysis process as previously described. However, the heat required to drive the pyrolysis process may be derived from other sources (e.g., an organic heat source such as char) as well known in the art. The heat transfer medium may be provided in a fluidized state and maintained at a temperature suitable for pyrolysis to pyrolyze the carbonaceous biomass feedstock. In one embodiment, the heat transfer medium may be fluidized by a fluidizing gas. Either flue gases from the pyrolysis reactor or a non-condensable portion of the pyrolysis gases are compressed and fed into the pyrolysis reactor 20 as a fluidizing gas for bed fluidization. The heat transfer medium forms a fluidized bed within the pyrolysis reactor.

Once the carbonaceous biomass feedstock has been pyrolyzed, solid carbon-containing char and pyrolysis gases comprising the condensable portion (vapors) and the non-condensable portion exit the pyrolysis reactor 20. The solid char may be separated from the pyrolysis gases. The spent heat transfer medium comprising the catalytic solids, the inert solids, or both, is separated from the pyrolysis gases and may be regenerated as is known in the art and hereinafter described. The spent heat transfer medium and solid char may also be concurrently separated from the pyrolysis gases.

A circulating fluidizing bed reactor (CFBR) is a preferred pyrolysis reactor. One such circulating bed transport reactor for use in fast pyrolysis is described, for example, in U.S. Pat. No. 5,961,786. There, the carbonaceous biomass feedstock, essentially oxygen-free fluidizing gas, and a heat transfer medium are rapidly mixed in a thermal mixing section of a pyrolysis reactor base section, then transported upward through an entrained-bed tubular reactor. After fast pyrolysis, a cyclonic hot solids recirculation system separates the solid heat transfer medium from the non-condensable pyrolysis gases and condensable pyrolysis gases (vapors) and returns the heat transfer medium to the mixing section to be used again. The heat required to drive the pyrolysis process is transferred to the mixing and reaction zones principally by recirculated heat transfer medium. Typically, there is no oxidation (combustion) occurring in the mixing and reaction zones to supply direct process heat as preferably there is very little oxygen present. Direct or indirect combustion of char or gas, or externally supplied fuel, or indirect electrical resistance heating may be employed to heat the recirculated heat transfer medium before injection into the mixing section. It is to be understood that the fast pyrolysis methods described above are exemplary. In addition, while mixing of the carbonaceous biomass feedstock with a heat transfer medium in the mixing section of a pyrolysis reactor has been described, the carbonaceous biomass feedstock may be mixed with the heat transfer medium prior to introduction into the pyrolysis reactor. The catalyst may alternatively be finely ground and used in a Fluid Catalytic Cracking (FCC) unit fed with the biomass.

Method 10 continues with condensing the condensable portion (vapors) of the pyrolysis gases (step 16). In this regard, the pyrolysis gases are passed to a condenser 26 (FIG. 2) or series of condensers with the non-condensable portion. The non-condensable portion may be recovered for other uses (not shown) (e.g., as a fluidizing gas). The non-condensable portion of the pyrolysis gases comprises hydrogen gas, methane, and carbon oxides which may be separated from each other by methods well known in the art. Ash-laden flue gas from the pyrolysis reactor is transferred from the reheater 22 to the separation apparatus 24 for separation of the ash from the flue gas. As previously described, the flue gas may be recycled to the pyrolysis reactor as the fluidizing gas for the pyrolysis reactor 20.

The condensable portion (vapors) of the pyrolysis gases comprising hydrocarbons and any residual oxygenated hydrocarbons is condensed in the condenser 26 into low oxygen biomass-derived pyrolysis oil having substantially improved energy density, lower total acid number (TAN), and higher thermal stability than conventional biomass-derived pyrolysis oil. The low oxygen biomass-derived pyrolysis oil has potential for use as a biofuel substantially eliminating the need for secondary upgrading to remove oxygen therefrom as is needed with conventional biomass-derived pyrolysis oils.

Pyrolyzing the carbonaceous biomass feedstock in the presence of the heat transfer medium/catalyst results in spent heat transfer medium/catalyst. The spent catalyst may be regenerated and recycled when its activity has dropped below a desired level. The time in which the catalyst will maintain its activity varies. Gradually, there may be a loss of catalyst activity due to fouling (e.g., due to carbon deposits formed on the catalyst). Heat transfer medium regeneration, whether the heat transfer medium comprises catalytic solids, inert solids, or both, as previously described can be performed by transferring the spent heat transfer medium after its separation from the pyrolysis gases to the reheater 12. The spent heat transfer medium may be heated under such conditions as to remove the carbonaceous materials from a surface thereof. The regenerated heat transfer medium then may be recirculated to the pyrolysis reactor. It is to be appreciated that the pyrolysis system shown in FIG. 2 is exemplary only, and other processes and sequences may be used in accordance with exemplary embodiments of the present invention.

EXAMPLES

The following examples are provided for illustration purposes only, and are not meant to limit the various embodiments of the present invention in any way. Biomass in the form of oak wood pellets was pyrolyzed in a fluidized bed reactor at about 500° C. to about 600° C. A biomass to catalyst ratio of about 0.2 mg biomass to about 1.0 mg catalyst was used. The biomass was pyrolyzed in the presence of each of the catalysts A-J identified in the table below, in accordance with exemplary embodiments. The respective catalyst was mixed with sand, the catalyst and the sand being the heat transfer medium. The biomass was also pyrolyzed in the absence of any catalyst, using sand alone as the heat transfer medium. The catalysts including zeolites as the catalyst or catalytic support were prepared as indicated below and heated to about 400° C. to about 600° C. before use. The sulfided catalysts were dried at 100° C. for one to 12 hours before use. The production of selected non-phenolic and phenolic oxygenated hydrocarbons, and aromatic hydrocarbons during pyrolysis was measured using known methods. The tracked non-phenolic oxygenated hydrocarbons included acetic acid, furfural, and levoglucosan, phenolics such as phenol, guaiacol, 4-methyl guaiacol, and syringol, and aromatic hydrocarbons such as benzene, toluene, ethylbenzene, p-xylene, and o-xylene. As a result of the catalytic pyrolysis as compared to pyrolysis in the presence of sand alone, the amount of oxygenated hydrocarbons in the liquid pyrolysis product (i.e., low oxygen biomass-derived pyrolysis oil) was reduced and the amount of total hydrocarbons increased.

| Catalyst | Preparation/Description |
|---|---|
| A | Synthetic Faujasite zeolite [9.06 wt % Na, .2468 nm (24.68 A) unit cell size] was subsequently exchanged with Ba nitrate. |
| B | Synthetic Faujasite zeolite [9.06 wt % Na, .2468 nm (24.68 A) unit cell size] was subsequently exchanged with Ca nitrate. For 1 kg: dissolve 1 kg of $Ca(NO_3)_2$ or $CaCl_2$ in 10 liter deionized (DI) water, stir in the zeolitic powder, heat up to ~60° C. and stir for ~30 min. Then filter over a Buchner funnel, wash with ~10 liter of hot DI water. Put the filter cake back in a second solution of 1 kg of $Ca(NO_3)_2$ or $CaCl_2$ in 10 liter DI water and repeat the procedure above (~60° C., 30 min. stirring, filtration, washing). A total of 7 wt % of Ca was exchanged in 2 passes. |
| C | Nickel and Tungsten on a silica-alumina support. |
| D | Nickel and Molybdenum on a large pore silica-alumina support. |
| E | Synthetic Faujasite zeolite |
| F | Nickel and Tungsten on an amorphous silica-alumina support. This catalyst is considered a low acidity catalyst. |
| G | Nickel and Tungsten on a support comprising crystalline silica-alumina and a steam stabilized Y zeolite bound with alumina. This catalyst is considered a medium acidity catalyst. |
| H | Nickel and Tungsten on a support comprised of a steam stabilized Y zeolite bound with alumina. This catalyst is considered a high acidity catalyst. |
| I | Platinum on a silica-alumina support. |
| J | Synthetic Faujasite zeolite was twice exchanged with ammonia and calcined to produce an intermediate material. This intermediate was subsequently washed with nitric acid to produce a final product [<0.2 wt % Na]. | wherein:

Catalysts containing Nickel and Tungsten are optionally sulfided

Catalysts A-I available from UOP LLC, Des Plaines, Ill. (USA)

Catalysts containing a synthetic Faujasite zeolite (See U.S. Pat. No. 3,130,007 incorporated herein by reference)

Catalyst J (See also, U.S. 2008/0171649, incorporated herein by reference)

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for producing low oxygen biomass-derived pyrolysis oil, the method comprising the steps of:
   pyrolyzing a carbonaceous biomass feedstock in the presence of a catalyst selected from the group consisting of base metal-based catalysts, noble metal-based catalysts, and combinations thereof to produce pyrolysis gases comprising oxygenated hydrocarbons, the catalyst catalyzing a deoxygenation reaction converting at least a portion of the oxygenated hydrocarbons into condensable hydrocarbons and oxygen and removing the oxygen as carbon oxides; and
   condensing a condensable portion of the pyrolysis gases to low oxygen biomass-derived pyrolysis oil.

2. The method of claim 1, wherein the step of pyrolyzing the carbonaceous biomass feedstock comprises using a heat transfer medium selected from the group consisting of the noble metal-based catalysts, the base metal-based catalysts, the treated zeolitic catalysts, inert solids, or a combination thereof.

3. The method of claim 1, wherein the step of pyrolyzing the carbonaceous biomass feedstock comprises pyrolyzing the carbonaceous biomass feedstock in the presence of the catalyst using a catalyst-to-carbonaceous biomass feedstock ratio of about 0.1 to about 10.

4. The method of claim 1, wherein the step of pyrolyzing the carbonaceous biomass feedstock comprises pyrolyzing the carbonaceous biomass feedstock in contact with a noble metal-based catalyst supported on a support material, the noble metal-based catalyst selected from the group consisting of ruthenium-based catalysts, rhodium-based catalysts, palladium-based catalysts, osmium-based catalysts, iridium-based catalysts, platinum-based catalysts, silver-based catalysts, gold-based catalysts, and mixtures thereof.

5. The method of claim 4, wherein the step of pyrolyzing the carbonaceous biomass feedstock comprises pyrolyzing the carbonaceous biomass feedstock in the presence of the noble metal-based catalyst containing from about 0.01% to about 10% by weight of noble metal, based on the support material.

6. The method of claim 5, wherein the step of pyrolyzing the carbonaceous biomass feedstock comprises pyrolyzing the carbonaceous biomass feedstock in contact with the noble metal-based catalyst supported on the support material, the support material for the ruthenium-based catalysts, the rhodium-based catalysts, the osmium-based catalysts, the iridium-based catalysts, the silver-based catalysts, the gold-based catalysts, and mixtures thereof comprising a metal oxide selected from the group consisting of alumina, silica, silica-alumina, titania, magnesia, zirconia, and mixtures thereof, a metal carbide, a metal nitride, a metal sulfide, carbon, a zeolite, or mixtures thereof, and the support material for the palladium-based catalysts and the platinum-based catalysts comprising carbon, a metal oxide selected from the group consisting of silica-alumina, titania, magnesia, and zirconia, a metal carbide, a metal nitride, a metal sulfide, a zeolite, or mixtures thereof.

7. The method of claim 6, wherein the step of pyrolyzing the carbonaceous biomass feedstock comprises pyrolyzing the carbonaceous biomass feedstock in contact with the noble metal-based catalyst supported on zeolites selected from the group consisting of structure types LTA, FAU, MOR, MFI, BEA, and combinations thereof.

8. The method of claim 1, wherein the step of pyrolyzing the carbonaceous biomass feedstock comprises pyrolyzing the carbonaceous biomass feedstock in the presence of a base metal-based catalyst supported on a support material, the base metal selected from the group consisting of W, Mo, Re, Ti, V, Cr, Mn, Fe, Co, Ni, Cu, Zn, and combinations thereof, and the support material comprising a metal oxide selected from the group consisting of alumina, silica-alumina, silica, zirconia, magnesia, and titania, carbon, and a zeolite having a structure type selected from the group consisting of LTA, FAU, MOR, MFI, and BEA.

9. The method of claim 8, wherein the step of pyrolyzing the carbonaceous biomass feedstock in the presence of a base metal-based catalyst supported on a support material comprises pyrolyzing the carbonaceous biomass feedstock in the presence of a base metal-based catalyst having a modifier element in combination with the base metal, the modifier element selected from the group consisting of Tin (Sn), Sulfur (S), Germanium (Ge), Phosphorus (P), sodium (Na), potassium (K), Lithium (Li), Calcium (Ca), lanthanide and actinide elements including Cerium (Ce) and Lanthanum (La), noble metals, and combinations thereof.

10. A method for producing low oxygen biomass-derived pyrolysis oil from carbonaceous biomass feedstock pyrolyzed in a pyrolysis reactor, comprising the steps of:
    providing a catalyst selected from the group consisting of base metal-based catalysts, noble-metal based catalysts, and combinations thereof;
    contacting the carbonaceous biomass feedstock with the catalyst and pyrolyzing the carbonaceous biomass feedstock to form pyrolysis gases comprising oxygenated hydrocarbons, the catalyst catalyzing a deoxygenation reaction converting at least a portion of the oxygenated hydrocarbons into condensable hydrocarbons and oxygen and removing the oxygen as carbon oxides; and
    condensing a condensable portion of the pyrolysis gases to the low oxygen biomass-derived pyrolysis oil.

11. The method of claim 10, wherein the step of providing a catalyst comprises providing the catalyst in a fluidized state and maintaining the catalyst at a temperature suitable for pyrolysis to pyrolyze the carbonaceous biomass feedstock.

12. The method of claim 10, wherein the step of contacting the carbonaceous biomass feedstock with the catalyst comprises contacting the carbonaceous biomass feedstock using a catalyst-to-carbonaceous biomass feedstock ratio of about 0.1 to about 10.

13. The method of claim 10, wherein the step of contacting the carbonaceous biomass feedstock comprises contacting the carbonaceous biomass feedstock with the noble metal-based catalyst containing from about 0.01% to about 10% by weight of noble metal, based on the support material.

14. The method of claim 13, wherein the step of contacting the carbonaceous biomass feedstock with the catalyst comprises contacting the carbonaceous biomass feedstock with a noble metal-based catalyst supported on a support material, the noble metal-based catalyst selected from the group consisting of ruthenium-based catalysts, rhodium-based catalysts, palladium-based catalysts, osmium-based catalysts, iridium-based catalysts, platinum-based catalysts, silver-based catalysts, gold-based catalysts, and mixtures thereof and the support material for the ruthenium-based catalysts, the rhodium-based catalysts, the osmium-based catalysts, the iridium-based catalysts, the silver-based catalysts, the gold-based catalysts, and mixtures thereof comprising a metal oxide selected from the group consisting of alumina, silica-alumina, silica, titania, magnesia, and zirconia, carbon, a metal carbide, a metal nitride, a metal sulfide, a zeolite, or mixtures thereof and the support material for the palladium-based catalysts and the platinum-based catalysts comprising carbon, a metal oxide selected from the group consisting of silica-alumina, titania, magnesia, and zirconia, carbon, a metal carbide, a metal nitride, a metal sulfide, a zeolite, or mixtures thereof.

15. The method of claim 10, wherein the step of contacting the carbonaceous biomass feedstock comprises contacting the carbonaceous biomass feedstock with the base metal-based catalyst selected from the group consisting of W, Mo, Re, Ti, V, Cr, Mn, Fe, Co, Ni, Cu, and Zn, and combinations thereof, supported on a support material comprising a metal oxide selected from the group consisting of alumina, silica, titania, magnesia, zirconia, and silica-alumina, carbon, a zeolite, and mixtures thereof.

16. The method of claim 15, wherein the step of contacting the carbonaceous biomass feedstock comprises contacting the carbonaceous biomass feedstock with the base metal-based catalyst having a modifier element in combination with the base metal, the modifier element selected from the group consisting of Tin (Sn), Sulfur (S), Germanium (Ge), Phosphorus (P), sodium (Na), potassium (K), Lithium (Li), Calcium (Ca), lanthanide and actinide elements including Cerium (Ce) and Lanthanum (La), noble metals, and combinations thereof.

17. A method for thermally converting carbonaceous biomass feedstock into hydrocarbons comprising the steps of:
pyrolyzing the carbonaceous biomass feedstock in a pyrolysis reactor to form pyrolysis gases comprising oxygenated hydrocarbons and a carbon-containing solid;
separating the carbon-containing solid from the pyrolysis gases; and
deoxygenating the oxygenated hydrocarbons by contacting the pyrolysis gases with a catalyst selected from the group consisting of noble metal-based catalysts, base metal-based catalysts, and combinations thereof at conditions sufficient to convert the oxygenated hydrocarbons into condensable hydrocarbons.

18. The method of claim 17, wherein the step of deoxygenating the oxygenated hydrocarbons by contacting the pyrolysis gases with the catalyst comprises contacting the pyrolysis gases with a noble metal-based catalyst supported on a low coke-forming support material, the noble metal-based catalyst selected from the group consisting of ruthenium-based catalysts, rhodium-based catalysts, palladium-based catalysts, osmium-based catalysts, iridium-based catalysts, platinum-based catalysts, silver-based catalysts, gold-based catalysts, and mixtures thereof and the support material for the ruthenium-based catalysts, the rhodium-based catalysts, the osmium-based catalysts, the iridium-based catalysts, the silver-based catalysts, the gold-based catalysts, and mixtures thereof comprising a metal oxide selected from the group consisting of alumina, silica-alumina, silica, titania, magnesia, and zirconia, carbon, a metal carbide, a metal nitride, a metal sulfide, a zeolite, or mixtures thereof and the support material for the palladium-based catalysts and the platinum-based catalysts comprising carbon, a metal oxide such as silica-alumina, titania, magnesia, and zirconia, a metal carbide, a metal nitride, a metal sulfide, a zeolite, and mixtures thereof.

19. The method of claim 17, wherein the step of deoxygenating the oxygenated hydrocarbons comprises converting at least a portion of the oxygenated hydrocarbons into hydrocarbons comprising aromatic hydrocarbons and non-aromatic hydrocarbons.

* * * * *